United States Patent [19]

Hyodo et al.

[11] Patent Number: 4,724,178
[45] Date of Patent: Feb. 9, 1988

[54] LINING MATERIAL FOR PIPE LINES

[75] Inventors: Masakatsu Hyodo; Koji Kusumoto; Takuji Sokawa, all of Settsu, Japan

[73] Assignee: Ashimori Kogyo Kabushiki Kaisha, Osaka, Japan

[21] Appl. No.: 932,740

[22] PCT Filed: Feb. 18, 1986

[86] PCT No.: PCT/JP86/00074

§ 371 Date: Oct. 17, 1986

§ 102(e) Date: Oct. 17, 1986

[87] PCT Pub. No.: WO86/04858

PCT Pub. Date: Aug. 28, 1986

[30] Foreign Application Priority Data

Feb. 18, 1985 [JP] Japan ................................ 60-29989
Oct. 18, 1985 [JP] Japan ............................... 60-231026

[51] Int. Cl.⁴ .............................................. F16L 55/16
[52] U.S. Cl. ...................................... 428/36; 428/246; 138/98; 138/124; 138/125
[58] Field of Search ................... 428/36, 246; 138/98, 138/124, 125

[56] References Cited

U.S. PATENT DOCUMENTS

| | | | |
|---|---|---|---|
| 4,368,091 | 1/1983 | Ontsuga et al. | 138/98 |
| 4,576,205 | 3/1986 | Mortinaga et al. | 138/98 |
| 4,600,615 | 7/1986 | Hyodo et al. | 138/125 |
| 4,681,783 | 7/1987 | Hyodo et al. | 428/36 |
| 4,684,556 | 8/1987 | Ontsuga et al. | 428/36 |

FOREIGN PATENT DOCUMENTS 58-69039 4/1983 Japan.
59-225920 12/1984 Japan.

Primary Examiner—John E. Kittle
Assistant Examiner—James J. Seidleck
Attorney, Agent, or Firm—Birch, Stewart, Kolasch & Birch

[57] ABSTRACT

A lining material utilizable for a pipe-lining method, which comprises a tubular textile jacket woven or knitted with synthetic fiber yarns provided on the exterior surface thereof with a laminated two or three layer film of the following resinous materials:

(1) in case of two layers:
the outer layer: a synthetic resin of polyolefin series having a stress-crack resisting property of at least 1000 hours the inner layer: (1) a resin wherein an ethylenically unsaturated carboxylic acid has been grafted to an ethylene-vinyl acetate copolymer or (2) a resin comprised of 30-70% of a resin wherein an ethylenically unsaturated carboxylic acid has been grafted to a polymer of an α-olefin and 70-30% of a styrene-ethylene butylene-styrene resin composition.

(2) in case of three layers:
between the above described outer layer and inner layer is interposed an intermediate layer of the following resinous material: the intermediate layer: a styrene-ethylene butylene-styrene resin composition.

10 Claims, 2 Drawing Figures

LINING MATERIAL FOR PIPE LINES

BACKGROUND OF THE INVENTION

1. Technical Field:

The present invention relates to a lining material for lining pipe lines, especially gas conduits, city water pipe lines and pipe lines for construction of power transmission wires or telecommunication cables, chiefly those buried in the ground, for the purpose of repair or reinforcement of the pipe lines.

2. Background Art:

In recent years, a method of applying a lining material onto the inner surface of city water pipe lines, gas conduits and construction pipe lines for power transmission wires or telecommunication cables is carried out for the purpose of repair or reinforcement of the pipe lines when superannuated. The method of applying a lining material is carried out in such manner that a flexible lining material in the form of a tube previously provided on the inner surface thereof with a binder is inserted into a pipe line and allowed to advance therein while turning the lining material inside out and pressing it against the inner surface of the pipe line under fluid pressure whereby the inner surface of the lining material is bonded onto the inner surface of the pipe line by the aid of the binder. According to this method, it is unnecessary to dig up a pipe line over its full length. The method has such merits that the lining work can be done within a short period of time for a long pipe line and is operable for a pipe line having a number of bends, thus being watched especially in recent years as a very excellent method.

As a lining material utilizable for this method should be flexible and air-impervious and is required to possess satisfactory strength in lengthwise and diametrical directions of the pipe line in consideration of any influence of creeping or earthquake occurring after lining, a tubular textile jacket having a film of a synthetic resin on the exterior surface thereof has hitherto been used as the lining material.

The filmy layer of the lining material is required to possess various characteristics such as flexibility, stretchability of a moderate degree and strength as well as good heat-resistance, abrasion-resistance and scratch-resistance.

In case of a lining material to be applied to city water pipe lines, a synthetic resin constituting the filmy layer should particularly be safe to the quality of water. A material utilizable for city water pipe lines is required to satisfy the specifications defined in individual countries, for example, those defined by the Japan Water Works Association (JWWA) in case of Japan. According to the specifications defined by JWWA, the material is required to satisfy the test for quality of water defined by ("Tar Epoxy Resin Paints for Water Works and Method of Coating " (K-115) wherein the specifications are defined in detail for turbidity, color scale, the amount of consumption of potassium permanganate, the amount of consumption of chlorine, etc. A synthetic resin of polyolefin series as well as a synthetic resin of fluorine series is specified as a resinous material forming the filmy layer of a lining material satisfying these specifications.

Of these synthetic resins, the fluorine resin is very expensive and inferior in extrusion characteristics so that it is not suited as a resinous material forming the filmy layer of a lining material for the pipe lines. Accordingly, the resinous materials for this application are substantially restricted to a synthetic resin of polyolefin series.

The synthetic resin of polyolefin series includes high density polyethylene-resin, medium density polyethylene resin, low density polyethylene resin, polypropylene resin, polybutene resin, etc. However, the resins other than low density polyethylene are inferior in flexibility, while the low density polyethylene is inferior in durability. Thus, these resins were not necessarily suitable as a material constituting the filmy layer of a lining material for pipe lines.

3. Prior Art:

The present inventors already devised as a lining material for city water pipe lines a material using a linear low density polyethylene resin or a material using a blend of polyethylene resin and pure styrene-ethylene butylene-styrene resin free from polypropylene resin and an oily substance for the filmy layer (Japanese Utility Model Applns. Nos. Sho. 58-176565 and 59-44499).

The linear low density polyethylene resin used in the lining material of the above mentioned Japanese Utility Model Appln. No. Sho. 58-176565 is a synthetic resin of polyolefin series comprised predominantly of ethylene, which is obtained by copolymerizing ethylene with an $\alpha$-olefin. The resin having a density of about 0.910–0.940 $g/cm^3$ belongs to a low density polyethylene resin and has a molecular structure similar to a linear high density polyethylene resin almost devoid of branched chains. This linear low density polyethylene resin is of such characteristics that the tensile strength is as high as about 330 $kg/cm^2$ and equals to that of a high density polyethylene resin and that the stress-crack resisting property is longer than 1000 hours to show excellent durability while possessing softness as seen in a low density polyethylene resin.

In general, polyethylene has good chemicals-resisting property. In case polyethylene is put in the state of receiving stress or retains stress at the time of being processed, however, polyethylene may form cracks when brought into contact with a certain kind of liquid or vapor. This phenomenon is called stress-crack. The stress-crack resisting property referred to herein is measured according to a testing method specified in ASTM-D-1693 wherein a polyethylene resin is allowed in the state of receiving a definite amount of stress to stand in a given environment and the resisting property is given in terms of a period of time elapsing until cracks are formed. This property is one of the standards for durability of polyethylene resins and is very important as a characteristic property required for pipe lines for passing water therethrough, especially in the event the lining material is smaller in diameter than the pipe lines and is pressed against them by expansion of the diameter of the lining material for lining.

The styrene-ethylene butylene-styrene resin used for the lining material of the above mentioned Japanese Utility Model Appln. No. Sho. 59-44499 is generally called an elastomer of styrene series and is a resin which is most excellent in rubbery elasticity among the thermoplastic elastomers substituted for vulcanized rubber. This styrene-ethylene butylene-styrene resin is characterized in that the residual double bond has been hydrogenated which exists in the central rubber block of a styrene-isoprene-ethylene block copolymer and that insufficient stability of the copolymer against heat and weathering action has remarkably been improved. The styrene-ethylene butylene-styrene resin is stable against heat and extremely flexible so that the resin has properties most desirable as a material for the film in the lining method.

However, it is rare that this styrene-ethylene butylene-styrene resin is used singly. In general, a commercially available "styrene-ethylene butylene-styrene resin" is inferior in stress-crack resisting property and fluidity so that the resin is incorporated with polypropylene having good compatibility therewith to improve stress-crack resisting property and with an oily substance to improve water-flowability and flexibility. As a result of tests on the quality of water, however, it has been found that a stabilizer in the polypropylene and the oily substance in the above mentioned commercially available "styrene-ethylene butylene-styrene resin" ooze out on the surface of the resin to increase the amount of consumption of chlorine in an undesirable manner. This commercially available "styrene-ethylene butylene-styrene resin" will be referred to hereinafter as the styrene-ethylene butylene-styrene resin composition.

SUMMARY OF THE INVENTION

Although the above described various new technical means were hitherto proposed by the present inventors, such technical means were still unsatisfactory as a material constituting a film of lining materials for city water pipe lines and involves problems as will be described hereinafter. A linear low density polyethylene resin used in the lining material disclosed in Japanese Utility Model Appln. No. Sho. 58-176565 is flexible as compared with high density polyethylene resin or medium density polyethylene resin but is not a satisfactorily flexible synthetic resin because of its Shore D hardness being about 50. This resin is not satisfactory in flexibility as a material used as a film of a lining material for lining pipe line according to the above mentioned method and makes it harder to evaginate the lining material as the diameter thereof becomes smaller so that the fluid pressure has to be elevated significantly to effect evagination.

A blend of a styrene-ethylene butylene-styrene resin and a linear low density polyethylene resin, etc. used in the lining material disclosed in Japanese Utility Model Appln. No. Sho. 59-44499 has a Shore D hardness of 40, for example, at a blend ratio of 50:50 and is flexible in comparison with the above described linear low density polyethylene resin alone but is still unsatisfactory. A blend wherein the content of the styrene-ethylene butylene-styrene resin is 70% is inferior in scratch-resistance and stress-crack resisting property.

Further, a synthetic resin of polyolefin series has such a generic characteristic property that it is inferior in bonding power and cannot be bonded sufficiently to a tubular textile jacket.

The present invention has been accomplished to solve these various problems and its object is to provide a lining material which meets the standard for the quality of water without any fear of pollution of water especially when applied to city water pipe lines and which is so flexible and easy to effect evagination as to facilitate lining works and is excellent in adhesion to a tubular textile jacket.

DETAILED DESCRIPTION OF THE INVENTION

The present invention is to attain the above mentioned subject according to a means as will be detailed hereinafter. The first lining material provided by the present invention comprises a tubular textile jacket provided on the exterior surface with a laminated two layer resinous film and is characterized in that the outer layer of the film is composed of a synthetic resin of polyolefin series having a stress-crack resisting property of at least 1000 hours and the inner layer of the film is composed of (1) a resin wherein an ethylenically unsaturated carboxylic acid has been grafted to an ethylene-vinyl acetate copolymer or (2) a resin comprised of 30-70% of a resin wherein an ethylenically unsaturated carboxylic acid has been grafted to a polymer of an α-olefin and 70-30% of a styrene-ethylene butylene-styrene resin composition. The second lining material provided by the present invention comprises a tubular textile jacket provided on the exterior surface thereof with a laminated three layer resinous film and is characterized in that the outer layer of the film is of a synthetic resin of polyolefin series having a stress-crack resisting property of at least 1000 hours, the intermediate layer of the film is composed of a styrene-ethylene butylene-styrene resin composition and the inner layer of the film is composed of (1) a resin wherein an ethylenically unsaturated carboxylic acid has been grafted to an ethylene-vinyl acetate copolymer or (2) a resin comprised of 30-70% of a resin wherein an ethylenically unsaturated carboxylic acid has been grafted to a polymer of an α-olefin and 70-30% of a styrene-ethylene butylene-styrene resin composition.

The tubular textile jacket used in the lining material of the present invention is a material used in the above mentioned known conventional arts. The manufacture of the lining material is carried out according to an extrusion molding method adapted for products of this kind. The thickness of the film of a resinous material laminated on the exterior surface of the tubular textile jacket is properly determined in consideration of the diameter of pipe lines and flexibility and mechanical strength of the resinous material. No particular limitation exists in the numerical ranges but those skilled in the art will easily understand the ranges in view of the numerical values illustrated in Examples given hereinafter.

EMBODIMENT FOR CARRYING OUT THE INVENTION

Figure 1:
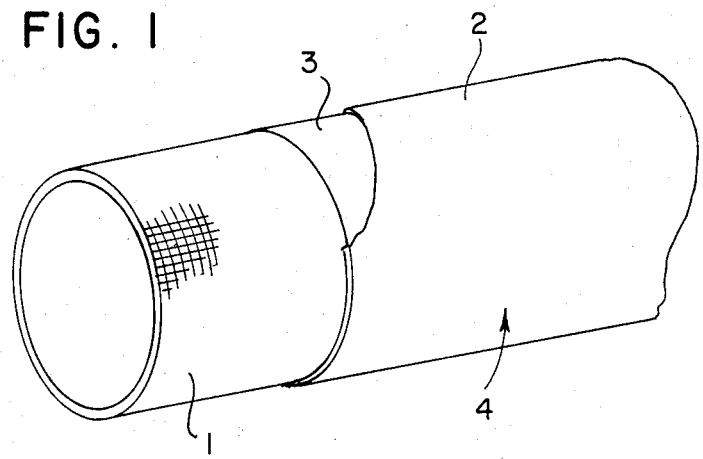
FIGS. 1 and 2 are respectively perspective views schematically showing the lining material of this invention fo pipe lines.
Figure 2:
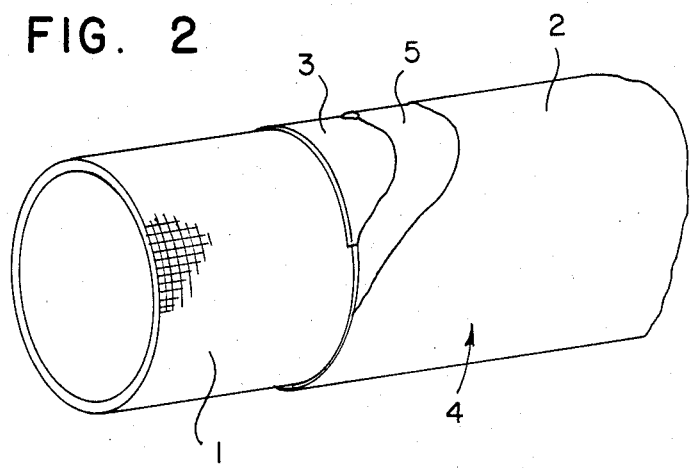

As schematically shown in FIG. 1, the first lining material of the present invention utilizable in the above mentioned lining method is characterized in that on the exterior surface of a tubular textile jacket 1 woven or knitted with synthetic fibers yarns, a synthetic resin of polyolefin series having a stress-crack resisting property of at least 1000 hours is formed as an outer layer 2 and the above mentioned resin (1) wherein an ethylenically unsaturated carboxylic acid has been grafted to an ethylene-vinyl acetate copolymer or the above mentioned mixture (2) comprised of 30-70% of a resin wherein an ethylenically unsaturated carboxylic acid has been grafted to a polymer of an α-olefin and 30–70% of the styrene-ethylene butylene-styrene resin composition is formed as an inner layer 3 to form a laminated two layer film 4. The second lining material of the present invention is, as schematically shown in FIG. 2, characterized in that a three layer laminate is formed by interposing an intermediate layer of the styrene-ethylene butylene-styrene resin composition between the outer layer 2 and the inner layer 3 of the above described first lining material 1.

In the lining material of the present invention, the synthetic resin of an α-olefin used as the outer layer 2 of the film 4 should have a stress-crack resisting property of at least 1000 hours as described above. The synthetic resins satisfying this criterion include a high density polyethylene resin having a density of at least 0.941 g/cm$^3$, a linear low density polyethylene resin having a density of 0.910–0.940 g/cm$^3$, a crosslinked polyethylene resin having a density of 0.910–0.940 g/cm$^3$, 1-polybutene resin, etc.

The ethylene-vinyl acetate copolymer constituting a skeleton of the above described resin (1) used for the inner layer 3 is preferably of a vinyl acetate content of about 7–30% since such copolymer has a lower melting point and is flexible and excellent in adhesibity. The above described resin (1) is made by grafting an ethylenically unsaturated carboxylic acid such as acrylic acid, methacrylic acid, maleic anhydride or a derivative thereof to the skeleton of the ethylene-vinyl acetate copolymer. The adhesivity of the resin is enhanced by imparting carboxyl groups to the ethylene-vinyl acetate copolymer.

The polymers of an α-olefin in the resin (2) used in the inner layer 3 are those of at least 3 carbon atoms, for example, polypropylene, 1-polybutene, etc. To this polymer of an α-olefin is grafted an ethylenically unsaturated carboxylic acid, for example, acrylic acid, methacrylic acid, maleic anhydride or a derivative thereof. The adhesivity of the resin is enhanced by imparting carboxylic groups to the α-olefin.

The above described polymer of an α-olefin is softened by blending with the styrene-ethylene butylene-styrene resin composition whereby its adhesivity is improved and at the same time the styrene-ethylene butylene-styrene composition is improved in its stress-crack resisting property to have durability.

On blending of the above resins, the blending ratio is such that the resin wherein the ethylenically unsaturated carboxylic acid has been grafted to the polymer of an α-olefin is 30–70% while the modified styrene-ethylene butylene-styrene resin composition is 70–30%. If the modified styrene-ethylene butylene-styrene resin composition is more than 70%, the resulting blend will be flexible but its adhesibity will be reduced to be inferior. On the other hand, if the resin composition is less than 30%, the resulting blend will be inferior in flexibility and adhesive power. In the lining material of the present invention, the blending ratio is adjusted to 50:50 whereby a resin having a Shore D hardness of about 70 is obtained, showing excellent adhesive power.

The styrene-ethylene butylene-styrene resin composition used for the intermediate layer 5 in the second lining material preferably is so flexible as to have a Shore D hardness of 30–80.

The production of a lining material is carried out, in case of the prior art lining materials, by forming a filmy layer directly on the exterior surface of the tubular textile jacket by extrusion molding of a synthetic resinous material and allowing the synthetic resinous material to intrude into the texture of the tubular textile jacket for bonding to form an integral filmy layer on the tubular textile jacket. It is advantageous that a laminated two or three layer tube of synthetic resins is formed on the outside of the tubular textile jacket 1 by extrusion molding and the interior of the tubular textile jacket is then evacuated to bond the tube of synthetic resins in closely attached state to the exterior surface of the tubular textile jacket 1 thereby forming the filmy layer 4.

According to the present invention, the outer layer 2 which is brought, after pipe-lining, into contact directly with a fluid flowing through the pipe line is comprised of a synthetic resin of polyolefin series which is excellent in stress-crack resisting property. Thus, the outer layer obtained does not give any influence on the quality of water even in case of using the lining material for city water pipe lines and excels in hydrolysis-resistance, heat-resistance and scratch-resistance. Thus, the use of the outer layer 2 can effectively prevent not only pollution of water but also any damage of the lining material when it is passed through a pipe line while being evaginated.

In the second lining material, an extremely flexible styrene-ethylene butylene-styrene resin composition is used as the intermediate layer 5 of the filmy layer 4 so that the whole filmy layer 4 is not damaged in flexibility but is rather improved in heat-resistance even if the resin blend is reduced in hardness but is especially excellent in adhesive power is used as the inner layer 3.

Specific embodiments of the lining material utilizable for city water pipe lines having a diameter of 200 mmφ will be illustrated as Examples of the present invention together with Comparative Examples. In each Example and each Comparative Example, a tubular textile jacket 1 was made by weaving warps and a weft in a tubular form in such manner that 2 groups of 638 yarns each of which was made by twisting four 1,100 d. polyester filament yarns were used as the warps and a yarn made by intertwisting two 1,100 d. polyester filament yarns with four 20S polyester spun yarns at a twisting time of 2.0–2.5/inch was used as the weft and picked up at 62 pick count/10 cm of the warps.

In order to maintain adhesivity to the filmy layer 4 while maintaining the strength of the lining material, it is preferable to use a spun yarn as a part of yarns constituting the tubular textile jacket 1 as in this example.

A specific construction of the filmy layer 4 to be formed on the exterior surface of the tubular textile jacket 1 is illustrated in each Example and each Comparative Example.

EXAMPLE 1

The outer layer : A high density polyethylene resin (Hi-zex 500H manufactured by Mitsui Petrochemical Co., Ltd., density: 0.950 g/cm$^3$, Shore D hardness: 60, melting point: 132° C., tensile strength: 370 kg/cm$^2$, elongation on break: 900%, and stress-crack resisting property: >1000 hours)

The inner layer: A resin wherein an ethylenically unsaturated carboxylic acid has been grafted to an ethylene-vinyl acetate copolymer (Modic 300S manufactured by Mitsubishi Petrochemical Co., Ltd., content of vinyl acetate: 25%, density: 0.950 g/cm$^3$, Shore D hardness: 54, melting point: 88° C., tensile strength: 110 kg/cm$^2$ and elongation on break: 850%)

The thickness of the filmy layer: 0.7 mm

The ratio in thickness of the outer layer to the inner layer: The outer layer/the inner layer = 1/1.

EXAMPLE 2

The outer layer: A linear low density polyethylene resin (Ultzex 2021L manufactured by Mitsui Petrochemical Co., Ltd., density: 0.918 g/cm$^3$, Shore D hardness: 50, melting point: 120° C., tensile strength: 330 kg/cm$^2$, elongation on break: 740% and stress-crack resisting property: >1000 hours)

The inner layer: The resin wherein an ethylenically unsaturated carboxylic acid has been grafted to an ethylene-vinyl acetate copolymer (as described above)

The thickness of the filmy layer: 0.7 mm

The ratio in thickness of the outer layer to the inner layer: the outer layer/the inner layer = 1/1.

EXAMPLE 3

The outer layer: A crosslinked low density polyethylene resin (Linklon XLE700A manufactured by Mitsubishi Petrochemical Co., Ltd., density: 0.928 g/cm$^3$, Shore D hardness: 53, tensile strength: 200 kg/cm$^2$, elongation on break: 500% and stress-crack resisting property: >1000 hours)

The inner layer: The resin wherein an ethylenically unsaturated carboxylic acid has been grafted to an ethylene-vinyl acetate copolymer (as described above)

The thickness of the filmy layer: 0.7 mm

The ratio in thickness of the outer layer to the inner layer: the outer layer/the inner layer = 1/1.

EXAMPLE 4

The outer layer: A 1-polybutene resin (Witron 1210A manufactured by Adeka Argus Chemical Co., Ltd., density: 0.905 g/cm$^3$, Shore D hardness: 52, melting point: 115° C., tensile strength: 288 kg/cm$^2$, elongation on break: 350% and stress-crack resisting property: >5000 hours)

The inner layer: The resin wherein an ethylenically unsaturated carboxylic acid has been grafted to an ethylene-vinyl acetate copolymer (as described above)

The thickness of the filmy layer: 0.7 mm

The ratio in thickness of the outer layer to the inner layer: the outer layer/the inner layer = 1/1.

EXAMPLE 5

The outer layer: The high density polyethylene (as described above)

The intermediate layer: a styrene-ethylene butylene-styrene resin (Rabalon ME6302 manufactured by Mitsubishi Petrochemical Co., Ltd., density: 0.90 g/cm$^3$, Shore A hardness: 68, melting point: 130° C., tensile strength: 161 kg/cm$^2$ and elongation on break: 850%)

The inner layer: The resin wherein an ethylenically unsaturated carboxylic acid has been grafted to an ethylene-vinyl acetat copolymer (as described above)

The thickness of the filmy layer: 0.7 mm

The ratio in thickness of the outer layer/the intermediate layer/the inner layer = 1/1/1.

EXAMPLE 6

The outer layer: The linear low density polyethylene resin (as described above)

The intermediate layer: The styrene-ethylene butylene-styrene resin (as described above)

The inner layer: The resin wherein an ethylenically unsaturated carboxylic acid has been grafted to an ethylene-vinyl acetate copolymer (as described above)

The thickness of the filmy layer: 0.7 mm

The ratio in thickness of the outer layer/the intermediate layer/the inner layer = 1/1/1.

COMPARATIVE EXAMPLE 1

A single layer of the high density polyethylene resin (as described above)

COMPARATIVE EXAMPLE 2

A single layer of the linear low density polyethylene resin (as described above)

COMPARATIVE EXAMPLE 3

A single layer of a resin comprised of a 50:50 blend of a linear low density polyethylene resin and a styrene-ethylene butylene-styrene resin (Rabalon 9200° C. manufactured by Mitsubishi Petrochemical Co., Ltd., density: 0.92 g/cm$^3$, Shore D hardness: 40, melting point: 130° C., tensile strength: 270 kg/cm$^2$, elongation on break: 750% and stress-crack resisting property: at least 1000 hours)

EXAMPLE 7

The outer layer: A high density polyethylene resin (Hi-zex 500H manufactured by Mitsui Petrochemical Co., Ltd., density: 0.950 g/cm$^3$, Shore D hardness: 60, melting point: 132° C., tensile strength: 370 kg/cm$^2$, elongation on break: 900% and stress-crack resisting property: at least 1000 hours).

The inner layer: A resin comprised of a 50:50 blend of a resin wherein an ethylenically unsaturated carboxylic acid has been grafted to polypropylene and the styrene-ethylene butylene-styrene resin composition (Modic F-300V manufactured by Mitsubishi Petrochemical Co., Ltd., molecular weight of the polypropylene: several ten thousands to two hundred thousands, rate of imparting the carboxylic acid: 1–15%, density: 0.89 g/cm$^3$, Shore A hardness: 70, melting point: 130° C., tensile strength: 65 kg/cm$^2$ and elongation on break: 500%)

The total thickness of the film: 0.7 mm

The ratio in thickness of the outer layer to the inner layer: the outer layer/the inner layer = 1/1.

EXAMPLE 8

The outer layer: A linear low density polyethylene resin (Ultzex 2021L manufactured by Mitsui Petrochemical Co., Ltd., density: 0.918 g/cm$^3$, Shore D hardness: 50, melting point: 120° C., tensile strength: 330 kg/cm$^2$, elongation on break: 740% and stress-crack resisting property: at least 1000 hours).

The inner layer: The resin comprised of a 50:50 blend of the resin wherein an ethylenically unsaturated carboxylic acid has been grafted to polypropylene and the styrene-ethylene butylene-styrene resin composition (same as in the foregoing Example 7).

The total thickness of the film: 0.7 mm

The ratio in thickness of the outer layer to the inner layer: the outer layer/the inner layer = 1/1.

EXAMPLE 9

The outer layer: A crosslinked low density polyethylene resin (Linklon XLE 700A manufactured by Mitsubishi Petrochemical Co., Ltd., density: 0.928 g/cm$^3$, Shore D hardness: 50 and stress-crack resisting property: at least 1000 hours).

The inner layer: The resin comprised of a 50:50 blend of the resin wherein an ethylenically unsaturated carboxylic acid has been grafted to polypropylene and the styrene-ethylene butylene-styrene resin composition (same as in the foregoing Example 7).

The total thickness of the film: 0.7 mm

The ratio in thickness of the outer layer to the inner layer: the outer layer/the inner layer=1/1.

EXAMPLE 10

The outer layer: A 1-polybutene resin (Witron 1210A manufactured by Adeka Argus Chemical Co., Ltd., density: 0.905 g/cm$^3$, Shore D hardness: 52, melting point: 115° C., tensile strength: 288 kg/cm$^2$, elongation on break: 350% and stress-crack resisting property: at least 5000 hours)

The inner layer: The resin comprised of a 50:50 blend of the resin wherein an ethylenically unsaturated carboxylic acid has been grafted to polypropylene and the styrene-ethylene butylene-styrene resin composition (same as in the foregoing Example 7).

The total thickness of the film: 0.7 mm

The ratio in thickness of the outer layer to the inner layer: the outer layer/the inner layer=1/1.

EXAMPLE 11

The outer layer: The high density polyethylene resin (same as in the foregoing Example 7)

The intermediate layer: The styrene-ethylene butylene-styrene resin composition (Rabalon ME 6302 manufactured by Mitsubishi Petrochemical Co., Ltd., density: 0.90 g/cm$^3$, Shore A hardness: 68, melting point: 130° C., tensile strength: 161 kg/cm$^2$ and elongation on break: 850%)

The inner layer: The resin comprised of a 50:50 blend of the resin wherein an ethylenically unsaturated carboxylic acid has been grafted to polypropylene and the styrene-ethylene butylene-styrene resin composition (same as in the foregoing Example 7).

The total thickness of the film: 0.7 mm

The ratio in thickness of each layer: The outer layer/the intermediate layer/the inner layer=1/1/1.

EXAMPLE 12

The outer layer: The linear low density polyethylene resin (same as in the foregoing Example 8)

The intermediate layer: The styrene-ethylene butylene-styrene resin composition (same as in the foregoing Example 11).

The inner layer: The resin comprised of a 50:50 blend of the resin wherein an ethylenically unsaturated carboxylic acid has been grafted to polypropylene and the styrene-ethylen butylene-styrene resin composition (same as in the foregoing Example 7).

The total thickness of the film: 0.7 mm

The ratio in thickness of each layer: The outer layer/the intermediate layer/the inner layer=1/1/1/

Performance Test (a) Characteristic properties of each resin

Hardness: In accordance with ASTM-D-2240, Shore D hardness or Shore A hardness of each resin was measured.

Density: The measurement was made in accordance with JIS-K-7112 (g/cm$^3$).

Tensile strength and elongation on break: The measurement was made in accordance with ASTM-D-6381 (kg/cm$^2$, %)

Stress-crack resisting property of the resin constituting the outer layer: The measurement was made in accordance with ASTM-D-1693 (hour)

Softening point (Vicat softening point): The measurement was made in accordance with ASTM-D-1525 (°C.)

(b) Characteristic properties of the laminate

A laminate was made by extrusion molding of only the filmy layer in each Example under the same condition as in the case of manufacturing lining materials. The tensile strength and elongation on break of the laminate was then measured in accordance with ASTM-D-6381 (kg/cm$^2$, %).

(c) Characteristic properties of the lining material

The lining material provided with the filmy layer illustrated in each Example and each Comparative Example was manufactured and tested to measure its characteristic properties. In case of Examples, the tubular textile jacket was evacuated immediately after extrusion of the laminate tube so that the laminate might be brought in tight contac with the exterior surface of the tubular textile jacket and bonded thereto. In case of Comparative Examples, the synthetic resin was allowed to intrude into the tubular textile jacket from the exterior surface thereof to form a filmy layer thereon thereby obtaining each lining material.

Temperature used for heat-resistance: Steam vapor was introduced into the lining material and the temperature (°C.) to which the filmy layer torelated was measured.

Amount of consumption of potassium permanganate: The measurement was made in accordance with the specification of JWWA-K-115 (mg/l).

Amount of consumption of residual chlorine: The measurement was made in accordance with the specification of JWWA-K-115 (ppm).

Peeling strength: The peeling power (kg/25 mm in width) between the tubular lining material and the filmy layer was measured by 180° peeling.

Scratch-resisting property: The lining material was applied onto the surface of an iron pipe having a diameter of 400–500 mm and a fabric belt having a load of 500 kg was applied onto the lining material in such manner that the belt was brought into contact with the lining material over the length within the range of 5–10 cm. The belt was then allowed to slide over 50 m at a speed of 10 m/min. to examine the degree of damage on the filmy layer.

Pressure for self-running evagination: The lining material was evaginated over 5 m under fluid pressure whereby the minimum fluid pressure (kg/cm$^2$) necessary for evagination was measured.

A result of the measurements made above is shown in Tables 1 and 2.

TABLE 1

| Item | Example 1 | Example 2 | Example 3 | Example 4 | Example 5 | Example 6 |
|---|---|---|---|---|---|---|
| Construction of lining material | | | | | | |
| Material for the outer layer | High density polyethylene | Linear low density | Crosslinked low density | Polybutene | High density polyethylene | Linear low density |

TABLE 1-continued

| | | | | | | |
|---|---|---|---|---|---|---|
| Material for the intermediate layer | — | polyethylene | polyethylene | — | Styrene-ethylene butylene-styrene resin composition | polyethylene Same as the left |
| Material for the inner layer | Ethylene-vinyl acetate copolymer* | Same as the left | Same as the left | Same as the left | Same as the left | Same as the left |
| Ratio in thickness of the resin | 1/1 | 1/1 | 1/1 | 1/1 | 1/1/1 | 1/1/1 |
| Thickness of the filmy layer | 0.7 | 0.7 | 0.7 | 0.7 | 0.7 | 0.7 |
| Characteristics of the laminated resin | | | | | | |
| Tensile strength | 250 | 220 | 160 | 185 | 210 | 180 |
| Elongation on break | 900 | 740 | 500 | 350 | 900 | 740 |
| Characteristics of the lining material | | | | | | |
| Temperature used for heat-resistance | 130 | 120 | 130 | 115 | 130 | 130 |
| Amount of consumption of potassium permanganate | 1.1 | 1.2 | 1.1 | 0.7 | 1.2 | 1.1 |
| Amount of consumption of residual chlorine | 0.2 | 0.3 | 0.3 | 0.3 | 0.2 | 0.2 |
| Peeling strength | 3.3 | 3.7 | 3.2 | 3.6 | 3.4 | 3.7 |
| Scratch-resisting property | Good-Excellent | Good | Good | Good-Excellent | Good-Excellent | Good |
| Pressure for self-running evagination | 1.0 | 0.6 | 0.6 | 0.6 | 0.7 | 0.4 |

| Item | Comparative Example 1 | Comparative Example 2 | Comparative Example 3 |
|---|---|---|---|
| Construction of lining material | | | |
| Material for the outer layer | High density polyethylene | Linear low density polyethylene | Linear low density polyethylene styrene-ethylene-styrene resin |
| Material for the intermediate layer | — | — | — |
| Material for the inner layer | — | — | — |
| Ratio in thickness of the resin | | | |
| Thickness of the filmy layer | 0.7 | 0.7 | 0.7 |
| Characteristics of the laminated resin | | | |
| Tensile strength | 370 | 330 | 270 |
| Elongation on break | 900 | 740 | 750 |
| Characteristics of the lining material | | | |
| Temperature used for heat-resistance | 130 | 120 | 130 |
| Amount of consumption of potassium permanganate | 1.2 | 1.1 | 0.7 |
| Amount of consumption of residual chlorine | 0.3 | 0.2 | 0.2 |
| Peeling strength | 2.0 | 2.0 | 1.7 |
| Scratch-resisting property | Good-Excellent | Good | Good |
| Pressure for self-running evagination | >2.0 | 1.5 | 1.0 |

*A resin manufactured by grafting an ethylenically unsaturated carboxylic acid to a styrene-vinyl acetate copolymer

TABLE 2

| Item | Example 7 | Example 8 | Example 9 | Example 10 | Example 11 | Example 12 |
|---|---|---|---|---|---|---|
| Construction of lining material | | | | | | |
| Material for the outer layer | High density polyethylene | Linear low density polyethylene | Crosslinked low density polyethylene | Polybutene | High density polyethylene | Linear low density polyethylene |
| Material for the intermediate layer | — | — | — | — | Styrene-ethylene butylene-styrene resin composition | Same as the left |
| Material for the inner layer | A mixture of polyolefin and styrene-ethylene butylene-styrene resin composition | Same as the left | Same as the left | Same as the left | Same as the left | Same as the left |
| Ratio in thickness of the resin | 1/1 | 1/1 | 1/1 | 1/1 | 1/1/1 | 1/1/1 |
| Thickness of the filmy layer | 0.7 | 0.7 | 0.7 | 0.7 | 0.7 | 0.7 |
| Characteristics of the laminated resin | | | | | | |
| Tensile strength | 220 | 200 | 140 | 150 | 200 | 170 |
| Elongation on break | 900 | 740 | 500 | 350 | 900 | 740 |
| Characteristics of the lining material | | | | | | |
| Temperature used for heat-resistance | 130 | 120 | 130 | 115 | 130 | 130 |
| Amount of consumption of potassium permanganate | 1.1 | 1.2 | 1.1 | 0.7 | 1.2 | 1.1 |
| Amount of consumption of residual chlorine | 0.2 | 0.3 | 0.3 | 0.3 | 0.2 | 0.2 |
| Peeling strength | 4.2 | 4.5 | 4.0 | 4.2 | 4.3 | 4.5 |
| Scratch-resisting property | Good-Excellent | Good | Good | Good-Excellent | Good-Excellent | Good |
| Pressure for self-running evagination | 1.0 | 0.6 | 0.6 | 0.6 | 0.7 | 0.4 |

Test on the quality of water

Using test pieces of the filmy layer of the lining material and the pipe lined with the lining material, tests were made in accordance with JWWA-K-115 to examine turbidity, color scale, amount of consumption of potassium permanganate, amount of consumption of residual chlorine, amounts of phenols, amines and cyan, odor and taste.

A result of test is shown in Table 3.

TABLE 3

| | Test piece of the filmy layer | Lined pipe |
|---|---|---|
| Turbidity | less than 0.5 | less than 0.5 |
| Color scale | less than 1 | less than 1 |
| Amount of consumption of potassium permanganate | 1.0 mg/l | 1.3 mg/l |
| Amount of consumption of residual chlorine | 0.3 ppm | 0.2 ppm |
| Phenols | less than 0.005 ppm | less than 0.005 ppm |
| Amine | Not detected | Not detected |
| Cyan | Not detected | Not detected |
| Odor and taste | No problem | No problem |

The lining material of the present invention is flexible and excellent in adhesive power acting between the tubular textile jacket 1 and the filmy layer 4. In case the lining material is used in the above described lining method, therefore, the lining material is easily evaginated without causing any damage of the filmy layer 4 or peeling it off from the tubular textile jacket 1. When the binder used in the above described lining material is heated to accelerate curing, the inner layer 3 is molten and intrudes into the texture of the tubular textile jacket 1 whereby any stress caused in the resin of the outer layer can be prevented. As is shown in FIG. 1, therefore, the adhesive power acting between the tubular textile jacket 1 and the filmy layer 4 is not significantly reduced even by elevation of temperature.

Further, delamination does not occur between the individual layers in the filmy layer 4 so that a pipe line excellent in durability can be provided for a prolonged period of time.

INDUSTRIAL APPLICABILITY

The lining material of the present invention for pipe lines is flexible and has a moderate stretchability and excellent mechanical strength and adhesivity together with heat-resistance, abrasion-resistance and scratch-resistance (stress-crack resistance). Furthermore, the lining material entirely satisfies the safety regulations for the quality of water when used for city water pipe lines. Thus, the lining material is very useful since it is suitable for repair or reinforcement of city water pipe lines and also gas conduits as well as pipe lines for constructing power transmission wires and telecommunication cables.

We claim:

1. A tubular lining material for pipe lines which is utilizable in a pipe-lining method wherein a flexible tubular lining material is inserted into a pipe line from one end thereof to the other end thereof while evaginating the tubular lining material under fluid pressure thereby bonding the inner surface of the tubular lining material onto the inner surface of the pipe line to effect pipe-lining and which comprises a tubular textile jacket woven or knitted with synthetic fiber yarns provided on the exterior surface thereof with a laminated two layer resinous film, characterized in that the outer layer of the film is comprised of a synthetic resin of polyolefin series having a stress-crack resisting property of at least 1000 hours and the inner layer of the film is comprised of (1) a resin wherein an ethylenically unsaturated carboxylic acid has been grafted to an ethylene-vinyl acetate copolymer or (2) a resin comprised of 30–70% of a resin wherein an ethylenically unsaturated carboxylic acid has been grafted to a polymer of an $\alpha$-olefin and 70–30% of a styrene-ethylene butylene-styrene resin composition.

2. A lining material according to claim 1, wherein the synthetic resin of polyolefin series is a high density polyethylene resin.

3. A lining material according to claim 1, wherein the synthetic resin of polyolefin series is a linear low density polyethylene resin.

4. A lining material according to claim 1, wherein the synthetic resin of polyolefin series is a crosslinked polyethylene resin.

5. A lining material according to claim 1, wherein the synthetic resin of polyolefin series is 1-polybutene resin.

6. A tubular lining material for pipe lines which is utilizable in a pipe-lining method wherein a flexible tubular lining material is inserted into a pipe line from one end thereof to the other end thereof while evaginating the tubular lining material under fluid pressure thereby bonding the inner surface of the tubular lining material onto the inner surface of the pipe line to effect pipe-lining and which comprises a tubular textile jacket woven or knitted with synthetic fiber yarns provided on the exterior surface with a laminated three layer resinous film, characterized in that the outer layer of the film is comprised of a synthetic resin of polyolefin series having a stress-crack resisting property of at least 1000 hours, the intermediate layer of the film is composed of a styrene-ethylene butylene-styrene resin composition and the inner layer of the film is comprised of (1) a resin wherein an ethylenically unsaturated carboxylic acid has been grafted to an ethylene-vinyl acetate copolymer or (2) a resin comprised of 30–70% of a resin wherein an ethylenically unsaturated carboxylic acid has been grafted to a polymer of an $\alpha$-olefin and 70–30% of a styrene-ethylene butylene-styrene resin composition.

7. A lining material according to claim 6, wherein the synthetic resin of polyolefin series is a high density polyethylene resin.

8. A lining material according to claim 6, wherein the synthetic resin of polyolefin series is a linear low density polyethylene resin.

9. A lining material according to claim 6, wherein the synthetic resin of polyolefin series is a crosslinked polyethylene resin.

10. A lining material according to claim 6, wherein the synthetic resin of polyolefin series is a 1-polybutene resin.

* * * * *